(12) United States Patent
Ice

(10) Patent No.: US 7,097,468 B2
(45) Date of Patent: Aug. 29, 2006

(54) LEAD FRAME FOR CONNECTING OPTICAL SUB-ASSEMBLY TO PRINTED CIRCUIT BOARD

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/809,992

(22) Filed: Mar. 26, 2004

(65) Prior Publication Data

US 2005/0191879 A1    Sep. 1, 2005

Related U.S. Application Data

(60) Provisional application No. 60/548,846, filed on Feb. 27, 2004.

(51) Int. Cl.
*H01R 12/00*    (2006.01)

(52) U.S. Cl. .................... 439/79; 439/736; 439/516; 385/92; 385/93; 385/89; 385/88

(58) Field of Classification Search ............. 439/79, 439/736, 885, 516, 43, 860, 242, 226, 236; 385/92, 93, 89, 88

See application file for complete search history.

(56) References Cited

U.S. PATENT DOCUMENTS

| 4,471,158 | A | * | 9/1984 | Roberts | ................ | 174/52.4 |
|---|---|---|---|---|---|---|
| 4,689,023 | A | * | 8/1987 | Strong et al. | ................ | 439/189 |
| 5,295,214 | A | | 3/1994 | Card et al. | | |
| 5,632,630 | A | | 5/1997 | Card et al. | | |
| 6,086,413 | A | * | 7/2000 | Karasik et al. | ............. | 439/516 |
| 6,488,534 | B1 | * | 12/2002 | Soga et al. | ................ | 439/516 |
| 6,527,571 | B1 | * | 3/2003 | Muta et al. | ................ | 439/246 |
| 6,652,294 | B1 | * | 11/2003 | Zhang | ................ | 439/83 |
| 6,688,897 | B1 | * | 2/2004 | Korsunsky et al. | ......... | 439/108 |
| 6,764,336 | B1 | * | 7/2004 | Ma et al. | ................ | 439/604 |
| 6,764,338 | B1 | * | 7/2004 | Fang | ................ | 439/607 |
| 6,796,852 | B1 | * | 9/2004 | Okamoto | ................ | 439/736 |
| 6,817,782 | B1 | * | 11/2004 | Togami et al. | ................ | 385/92 |
| 6,922,231 | B1 | | 7/2005 | Wang et al. | | |
| 2003/0026081 | A1 | | 2/2003 | Liu et al. | | |

\* cited by examiner

*Primary Examiner*—Gary F. Paumen
(74) *Attorney, Agent, or Firm*—Workman Nydegger

(57) ABSTRACT

Lead frame connectors for connecting optical sub-assemblies to printed circuit boards in optical transceiver modules. The lead frame connectors include a stamped and bent conductive lead structure that is encased in an insert injection molded plastic casing. The plastic casing provides electrical insulation for the conductors in the lead frame as well as mechanical support for the finished component. The lead frame connectors connect to the leads associated with the optical sub-assemblies and are surface mounted onto the printed circuit board to establish connectivity between the optical sub-assembly and the printed circuit board. The lead frame assemblies are generally more reliable and less expensive than using flexible printed circuit board structures to establish electrical connectivity between optical sub-assemblies and transceiver printed circuit boards.

10 Claims, 4 Drawing Sheets

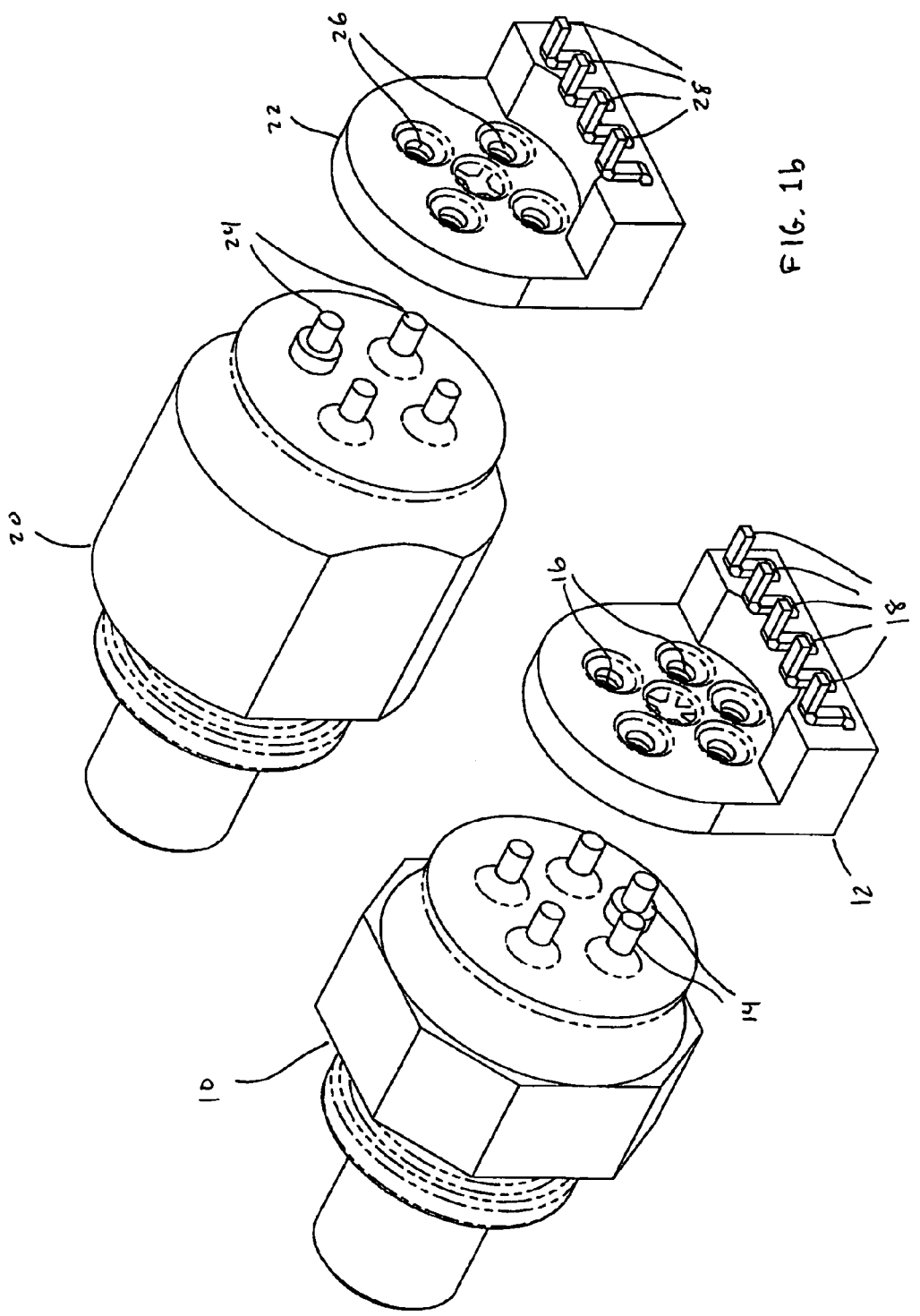

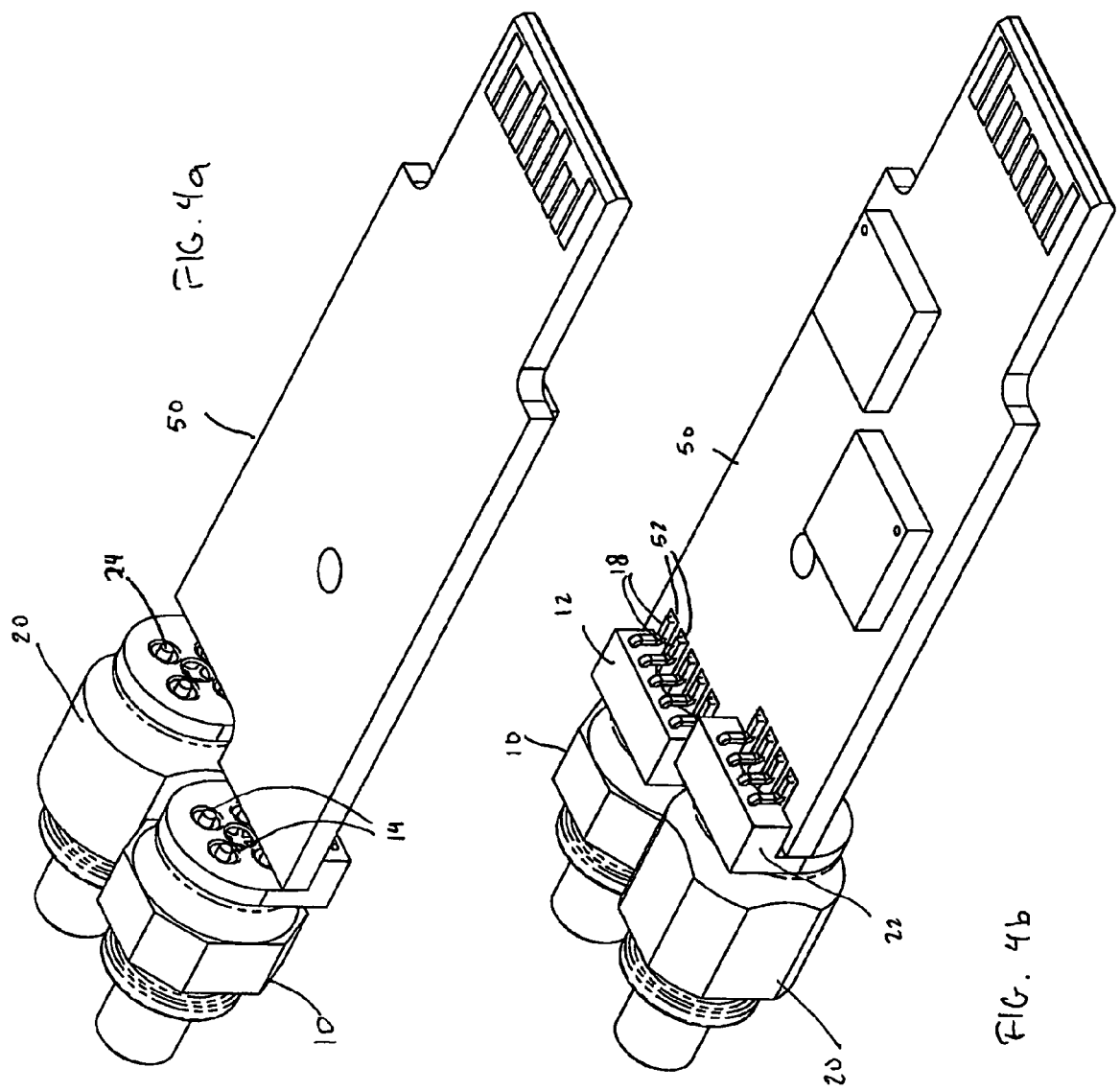

LEAD FRAME FOR CONNECTING OPTICAL SUB-ASSEMBLY TO PRINTED CIRCUIT BOARD

RELATED APPLICATION

This application claims the benefit of U.S. Provisional Patent Application Ser. No. 60/548,846, filed Feb. 27, 2004, which is incorporated herein by reference.

BACKGROUND OF THE INVENTION

1. The Field of the Invention

The present invention relates generally to optical transceiver modules. More specifically, the present invention relates to lead frame connectors used to connect an optical sub-assembly to a printed circuit board in an optical transceiver module.

2. Background and Relevant Art

Optical transceivers are used to transmit and receive optical signals from an optical network and to enable electrical network components to interface with and communicate over optical networks. Many optical transceivers are modular and are designed in accordance with industry standards that define mechanical aspects of the transceivers, form factors, optical and electrical requirements, and other characteristics and requirements of the transceivers. For example the Small Form-Factor Module Multi-Source Agreement (SFF MSA), the Small Form-Factor Pluggable Module Multi-Source Agreement (SFP MSA) and the 10 Gigabit Small Form Factor Pluggable Module Multi-Source Agreement (XFP MSA) Revision 3.1 define such standards and are incorporated herein by reference.

The basic optical components of conventional transceivers include a transmitter optical sub-assembly (TOSA) and a receiver optical sub-assembly (ROSA). The TOSA receives electrical signals from a host device via circuitry of the transceiver module and generates a corresponding optical signal that is then transmitted to a remote node in an optical network. Conversely, the ROSA receives an incoming optical signal and outputs a corresponding electrical signal that can then be used or processed by the host device.

The electrical connections between the optical sub-assemblies and a printed circuit board (PCB) in the transceiver module have various electrical and mechanical requirements. One of the most common electrical connection components used in conventional optical transceiver modules is a flexible printed circuit board, or "flex circuit," that connects the rigid printed circuit board of the module to leads associated with the TOSA or ROSA. Flex circuits have several advantages, including good electrical performance and radio frequency response and the ability to take up tolerances in the modules and to withstand stresses that arise during manufacture and operation of the modules. Examples of flex circuits used in optical transceiver modules are described in U.S. patent application Ser. No. 10/409,837, filed Apr. 9, 2003, which is incorporated herein by reference. The foregoing patent application also illustrates other components of optical transceiver modules, such as TOSAs and ROSAs, and includes other general information regarding optical transceiver modules that is useful as background material for the invention described herein.

While flex circuits have been widely used in recent years in optical transceiver modules, flex circuits represent a significant portion of the costs and labor required to manufacture transceiver modules. As the price of transceiver modules drops, the costs associated with flex circuits continue to represent an increasing proportion of the overall costs of transceiver modules.

Other approaches to connecting optical sub-assemblies to printed circuit boards have been introduced in recent years. For example, the leads protruding from TOSAs and ROSAs can be bent into a configuration that enables the leads to be directly soldered or otherwise connected to the printed circuit board. This technique is often less expensive than the use of flex circuits, but can lead to unfavorable RF response due to the inability to carefully control impedances. In addition, machining leads of TOSAs and ROSAs introduces reliability risks due to the likelihood of damaging glass or other fragile portions of header assemblies in TOSAs and ROSAs that enclose the lasers and photodetectors, respectively.

Because of the possibility of damaging the TOSAs and ROSAs and poor electrical performance, bending leads to enable the optical sub-assemblies to be directly connected to the printed circuit board is not suitable for many transceiver modules. This approach is particularly unsuitable for relatively high-speed transceiver modules, in which the RF response of the conductors is more important.

BRIEF SUMMARY OF EMBODIMENTS OF THE INVENTION

The present invention relates to lead frame connectors that are used to electrically and mechanically connect optical sub-assemblies to printed circuit boards in optical transceiver modules. The lead frame connectors enable optical sub-assemblies to be connected to the printed circuit board in optical transceiver modules in a reliable and inexpensive manner. The use of such lead frame connectors eliminates the need for flexible printed circuit boards that have been used in conventional transceiver modules.

According to one embodiment, the lead frame connector includes a stamped and bent conductive lead structure that is encased within an insert injection molded plastic casing. The plastic casing provides electrical insulation for the conductors in the lead frame as well as mechanical support for the finished component. The lead frame connectors connect to the leads associated with the optical sub-assemblies. The lead frame connectors also can be surface mounted onto the printed circuit board to establish connectivity between the optical sub-assembly and the printed circuit board. The lead frame connectors can be adapted for use with transmitter optical sub-assemblies and receiver optical sub-assemblies, and can have any necessary number of leads.

One advantage of the lead frame connectors is that they can be designed to yield desirable electrical performance and RF response. These results can be achieved because of the ability to control impedances based on the fact that the width and shape of the conductors and the gaps between conductors can be carefully controlled. In addition, the electrical properties of the plastic material used in the molded casing can be considered when designing for desirable electrical response.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1a illustrates a ROSA and a corresponding lead frame connector that is constructed according to an embodiment the invention.

FIG. 1b illustrates a TOSA and a corresponding lead frame connector that is constructed according to an embodiment of the invention.

FIG. 2a further illustrates the ROSA lead frame connector of FIG. 1a.

FIGS. 2c–2f illustrates various views of the ROSA lead frame connector of FIG. 1a.

FIGS. 4a and 4b are perspective views of opposite sides of a printed circuit board that has lead frame connectors attached thereto.

DETAILED DESCRIPTION OF THE PREFERRED EMBODIMENTS

Figure 2C:
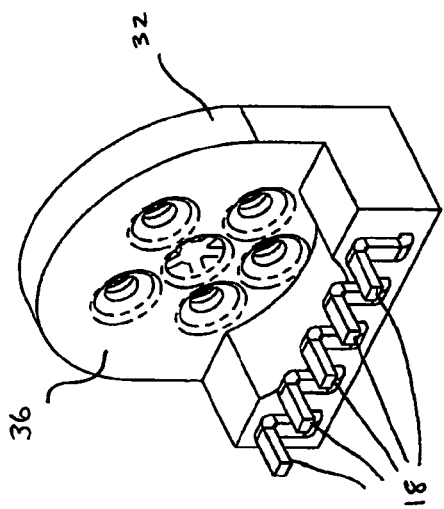

The present invention relates to lead frame connectors that are used to electrically and mechanically connect optical sub-assemblies to printed circuit boards in optical transceiver modules. According to one embodiment, the lead frame connector is fabricated using an insert injection molding process applied to a reel-to-reel stamped lead frame ribbon. The lead frame connectors connect to the leads associated with the optical sub-assemblies. The lead frame connectors also can be surface mounted onto the printed circuit board to establish connectivity between the optical sub-assembly and the printed circuit board.

The lead frame connectors of the invention provide several advantages compared to the use of flex circuits or other conventional techniques. Compared to flex circuits, the lead frame connector components are significantly less expensive. In addition, the process of manufacturing a transceiver module using lead frame connectors is more automated and requires less labor. Compared to simply bending the leads of the optical sub-assemblies to permit direct connection to a PCB, the lead frame connectors have significantly better electrical performance and RF response. Moreover, there is no significant risk of damaging the fragile portions of the optical sub-assemblies during the process of connecting the optical sub-assemblies to the PCB.

1. Lead Frame Connector Structure

FIG. 1a illustrates a ROSA 10 and a corresponding lead frame connector 12 that is constructed according to an embodiment the invention. ROSAs typically have five leads 14, and the lead frame connector 12 of FIG. 1a has five corresponding electrical contacts 16 and leads 18. FIG. 1b illustrates a TOSA 20 and a corresponding lead frame connector 22 that is constructed according to an embodiment of the invention. TOSAs typically have four leads 24, and the lead frame connector 22 of FIG. 1b has four corresponding electrical contacts 26 and leads 28. Although the lead frame connectors of FIGS. 1a and 1b are shown with four and five electrical contacts and leads, respectively, the principles of the invention disclosed herein can be applied to form lead frame connectors that have substantially any number of required electrical contacts and leads.

Figure 2B:
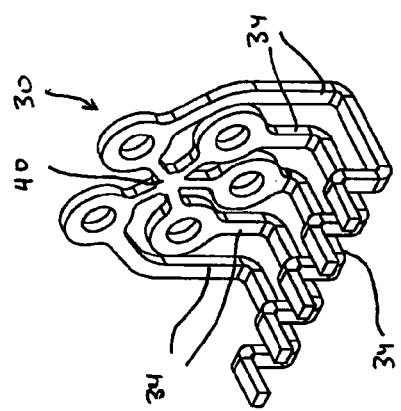
FIG. 2b illustrates a stamped and bent lead frame without the plastic casing that is insert injection molded around the lead frame.
Figure 2A:
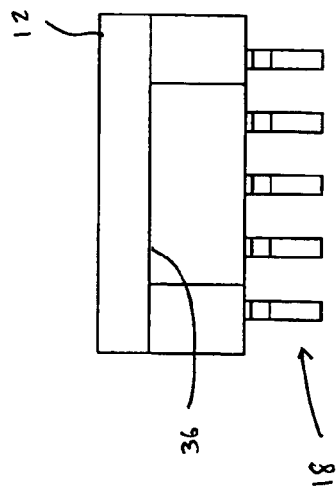
Figure 2F:
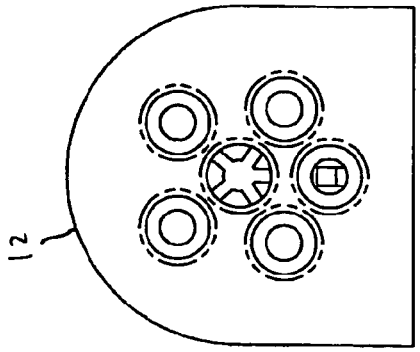
Figure 2E:
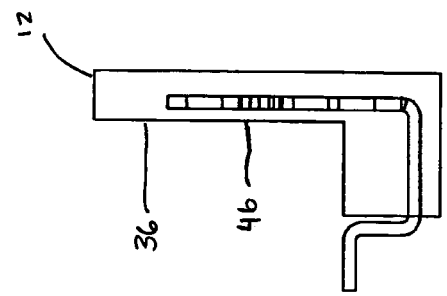
Figure 2D:
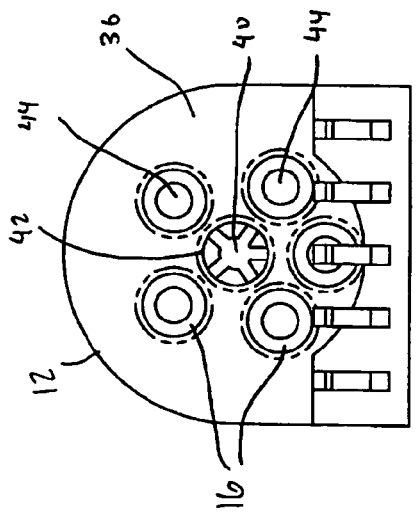
Figure 3C:
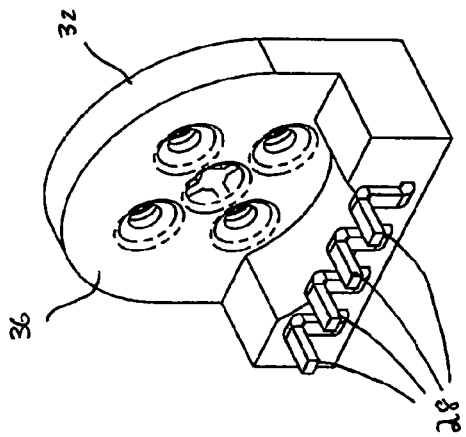
FIGS. 3c–3f illustrates various views of the TOSA lead frame connector of FIG. 1b.
Figure 3F:
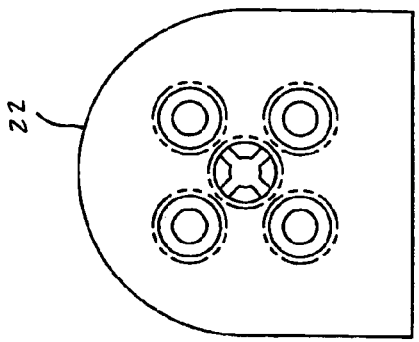
Figure 3B:
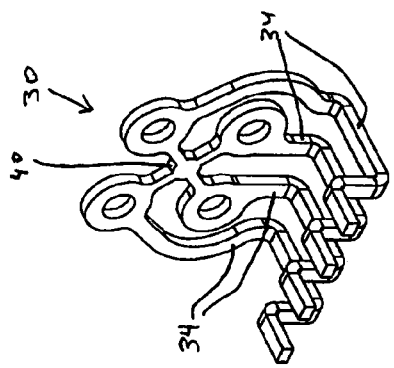
FIG. 3b illustrates a stamped and bent lead frame without the plastic casing that is insert injection molded around the lead frame.
Figure 3E:
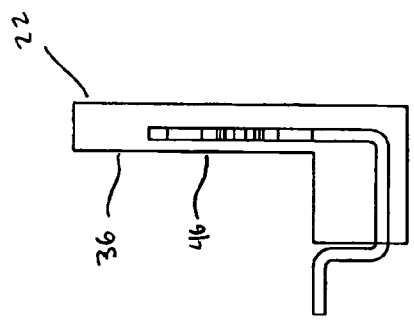
Figure 3A:
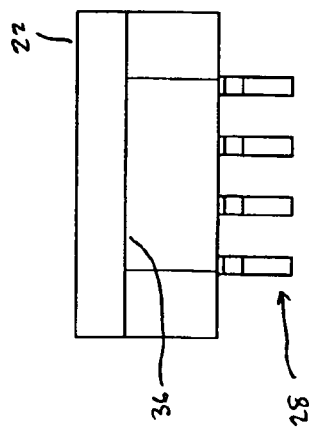
FIG. 3a further illustrates the TOSA lead frame connector of FIG. 1b.
Figure 3D:
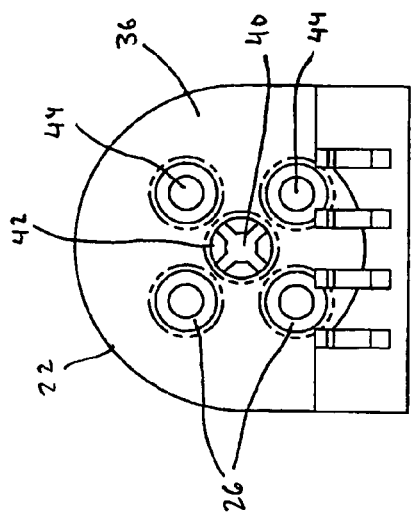

FIGS. 2a and 2c–2f show various views of the ROSA lead frame connector 12 of FIG. 1a. FIG. 2b illustrates a stamped and bent lead frame 30 without the plastic casing 32 that is insert injection molded around the lead frame. The plastic casing 32 provides electrical insulation for the conductors 34 in the lead frame 30 as well as mechanical support for the finished component. FIG. 2b illustrates the lead frame 30 in a condition prior to the five leads being electrically separated one from another in a process that is described in greater detail below. FIGS. 3a–3f illustrate corresponding views of the TOSA lead frame connector 22 of FIG. 1b.

In FIGS. 2a–2f and 3a–3f, the electrically insulating casing 32 has a surface 36 that defines a plane. In the illustrated embodiment, the plurality of electrical contacts 16 are arrayed in a configuration that is substantially parallel to the plane defined by the casing 32. As also illustrated, the conductors 34 are bent in three dimensions, such that, in the illustrated embodiment, the plurality of leads 18 extend out of the casing 32 in a direction that is not parallel to the plane defined by the casing 32. Of course, depending on the position of the optical sub-assemblies and the printed circuit board in any particular optical transceiver module, the conductors 34 can be bent in any necessary orientation.

The lead frame connectors 12 and 22 of FIGS. 1a and 1b yields desirable electrical performance and RF response. These results can be achieved because of the ability to control impedances based on the fact that the width and shape of the conductors 34 and the gaps between conductors can be carefully controlled. The shape, position, and dimensions of the conductors 34 in the lead frame connectors 12 and 22 can be selected based on the electrical and RF conditions that are to be experienced in any particular transceiver module. Prior to beginning manufacturing of the lead frame conductors 12 and 22, computer simulations of various designs can be performed to identify those that generate acceptable RF responses. The plastic material used to mold the lead frame connectors 12 and 22 is selected to have an appropriate dielectric constant as determined by this simulation process or, in the alternative, the dielectric constant is used as an input to the simulation process. The electrical performance of the lead frame connectors 12 and 22 is particularly important for relatively high frequency transceiver modules, such as those that operate a 1, 2, 4, or as much as 10 Gbit/second or higher. The lead frame connectors of the invention can be used with any of these modules while exhibiting acceptable RF responses.

2. Lead Frame Connector Fabrication Process

One of the advantages of the lead frame connectors of the invention is that they can have manufacturing costs that are much lower than the costs of manufacturing flex circuits that have conventionally been used in optical transceiver modules. In addition to the lead frame connectors themselves, the embodiments of the invention also extend to methods of manufacturing the lead frame connectors.

According to one embodiment, the method of manufacturing lead frame connectors 12 and 22 is performed using a reel-to-reel insert injection molding process. Reel-to-reel insert injection molding processes are known generally in the art, but have not previously been applied to the manufacture of connectors that can be used to connect optical sub-assemblies to printed circuit boards of optical transceiver modules.

The process of manufacturing the lead frame connector includes a step of stamping the appropriate conductor structure and configuration in a ribbon of conductive material. For example, the general conductor configuration 34 shown in FIGS. 2b and 3b can be formed by stamping a copper ribbon. The conductor configuration can be easily selected to conform with the conductor design that has been determined to have acceptable electrical performance as described above.

The stamped ribbon is spooled from one reel to another while being passed through the insert injection molding process. During this process, the conductors 34 of the stamped ribbon are bent or manipulated as needed in three dimensions as shown, for example, in FIGS. 2b and 3b, to achieve the necessary three-dimensional conductor configuration. The insert injection molding process forms the plastic casing about the lead frame, which provides mechanical support and electrical isolation for the conductors.

After the plastic casing 32 is formed, the lead frame assembly is passed through a singulation die that dices the ribbon into individual lead frame assemblies. During the preceding insert injection molding process, the individual conductors in the lead frame are held together using a portion of the lead frame. In general, lead frame manufacturing processes use a portion of the lead frame structure to mechanically stabilize the individual conductors during the stamping and molding process. Conventional lead frame manufacturing processes typically use external stabilization, meaning that the individual conductors are typically stabilized and connected to an external support structure that is sheared off during the singulation stage. One problem associated with stabilization and singulation in this manner is that conductive stubs often remain in electrical contact with the leads after this step. Sizeable stubs can act as antennas and degrade the RF response of the lead frame structure.

According to one embodiment of the invention, relatively large stubs are avoided by using an internal stabilization process illustrated in FIGS. 2b, 2d, 3b and 3d. The process is generally similar for both the TOSA and ROSA connectors, and the details are discussed herein in reference to the ROSA connector of FIGS. 2b and 2d. In particular, the five individual conductors of FIG. 2b are connected centrally one to another with a "starburst" conductive structure 40 in a way that provides mechanical stabilization during the molding process. This structure 40 is in contrast to external stabilization structures that have typically been used in lead frame molding processes. After the molding process is complete, the conductive starburst structure 40 is punched out through a central, or isolating, hole 42 shown in FIG. 2d. This punching operation removes most of the conductive material that had stabilized the conductors and serves to electrically separate the conductors one from another. This operation also leave only negligible stubs that do not significantly degrade the RF response, even at high frequencies, such as 1, 2, 4 or 10 Gbits/second or higher.

3. Transceiver Manufacturing Process Using Lead Frame Connectors

FIGS. 4a and 4b illustrate opposite sides of a printed circuit board 50 that has lead frame connectors 12 and 22 attached thereto. The invention disclosed herein also extends to methods of manufacturing or assembling optical transceiver modules using the lead frame connectors 12 and 22. According to one embodiment, the method of manufacturing a transceiver module includes a step of connecting the lead frames 12 and 22 to the corresponding optical sub-assemblies 10 and 20. As the process is substantially the same for the ROSA and the TOSA, the processing of only the ROSA 10 is described in detail below.

The ROSA lead frame connector 12 is aligned with the leads 14 that protrude from the back end of the ROSA. The leads 14 pass through corresponding holes 44 in the ROSA lead frame connector 12 and the leads 14 are soldered to the conductors of the lead frame assembly 12. Passing the leads 14 through the holes 44 in the corresponding electrical contacts 16 can result in substantial self-alignment of the lead frame connector 12 with the optical sub-assembly 10. As shown in FIG. 1a, the leads 14 of the ROSA 10 can be conveniently accessed from the opposite side 46 of the lead frame connector 12 to facilitate this soldering process. Once the soldering has been performed, the combined ROSA 10 and lead frame connector 12 becomes a surface mount device that can then be mounted to the PCB 50.

The process of surface mounting the combined ROSA 10 and lead frame connector 12 to the PCB 50 can be performed in any of a variety of ways. As shown in FIG. 4b, the lead frame connector 12 has an array of leads or pins 18 that are bent in a way that allows them to contact a corresponding array of pads 52 on the PCB 50. As the leads or pins 18 of the lead frame connector 12 are placed in contact with the pads 52, the physical connection is made by hand soldering, by reflow of a solder paste formed on the PCB 50, by a hot bar process, or by any other suitable technique. Another option is to use a fixture that facilitates the process of placing the lead frame connector to the PCB 50 and soldering it thereto.

It is noted that, according to certain embodiments of the invention, the process of connecting the combined ROSA 10 and lead frame connector 12 to the PCB 50 does not require epoxy reinforcement and avoids alignment handling issues that have been experienced in conventional methods of connecting optical sub-assemblies to PCBs using, for instance, flex circuits.

The present invention may be embodied in other specific forms without departing from its spirit or essential characteristics. The described embodiments are to be considered in all respects only as illustrative and not restrictive.

I claim:

1. A lead frame connector for connecting an optical sub-assembly to a printed circuit board of an optical transceiver module, comprising:

an electrically insulating casing having an isolating hole formed therein; and a plurality of conductors that are electrically isolated one from another by the electrically insulating casing, the plurality of conductors forming:

a plurality of electrical contacts that correspond to and can be connected to leads of the optical sub-assembly; and a plurality of leads that correspond to and can be connected to conductive structures on the printed circuit board; and wherein the plurality of conductors are exposed at the isolating hole.

2. A lead frame connector as defined in claim 1, wherein the optical sub-assembly is a transmitter optical sub-assembly.

3. A lead frame connector as defined in claim 2, wherein the plurality of electrical contacts consists of four electrical contacts.

4. A lead frame connector as defined in claim 1, wherein the optical sub-assembly is a receiver optical sub-assembly.

5. A lead frame connector as defined in claim 4, wherein the plurality of electrical contacts consists of five electrical contacts.

6. A lead frame connector as defined in claim 1, wherein each of the plurality of electrical contacts has a hole formed therethrough, wherein the hole is configured to receive the corresponding lead of the optical sub-assembly.

7. A lead frame connector as defined in claim 1, wherein:
each of the plurality of conductors has a shape, a position and dimensions that are selected according to particular RF conditions; and
the electrically insulating casing has a dielectric constant that is selected according to the particular RF conditions.

8. A lead frame connector as defined in claim 1, wherein the conductors are bent at segments thereof between the plurality of electrical contacts and the plurality of leads.

9. A lead frame connector as defined in claim 1, wherein the electrically insulating casing is insert injection molded over a portion of the plurality of conductors.

10. A lead frame connector for connecting an optical sub-assembly to a printed circuit board of an optical transceiver module, comprising:
an electrically insulating casing forming a body that defines a plane, the electrically insulating casing having an isolating hole formed therein; and
a plurality of conductors that are exposed at the isolating hole and are electrically isolated one from another by the electrically insulating casing, the plurality of conductors forming:
a plurality of electrical contacts exposed through the electrically insulating casing, the electrical contacts being arrayed in a configuration that is substantially parallel to the plane defined by the casing, wherein the electrical contacts correspond to and can be connected to leads of the optical sub-assembly; and
a plurality of leads that correspond to and can be connected to conductive structures on the printed circuit board, wherein each of the leads extends from the casing in a direction that is not parallel with the plane defined by the casing.

* * * * *